(12) United States Patent
Le Neindre et al.

(10) Patent No.: US 7,881,834 B2
(45) Date of Patent: Feb. 1, 2011

(54) SPEED RATIO SHIFT METHOD

(75) Inventors: Yvan Le Neindre, Paris (FR); Gaetan Rocq, La Boissiere-Ecole (FR); Olivier Boury, Nanterre (FR)

(73) Assignee: Peugeot Citroen Automobiles SA, Velizy Vilacoublay (FR)

( * ) Notice: Subject to any disclaimer, the term of this patent is extended or adjusted under 35 U.S.C. 154(b) by 741 days.

(21) Appl. No.: 11/817,675

(22) PCT Filed: Feb. 24, 2006

(86) PCT No.: PCT/FR2006/050165

§ 371 (c)(1),
(2), (4) Date: Aug. 31, 2007

(87) PCT Pub. No.: WO2006/092524

PCT Pub. Date: Sep. 8, 2006

(65) Prior Publication Data

US 2008/0195266 A1 Aug. 14, 2008

(30) Foreign Application Priority Data

Mar. 1, 2005 (FR) .................. 05 50543

(51) Int. Cl.
*B60K 6/38* (2007.10)
(52) U.S. Cl. .................. 701/22; 701/67; 903/946; 180/65.6
(58) Field of Classification Search .................. 701/22, 701/67; 903/946; 180/65.6
See application file for complete search history.

(56) References Cited

U.S. PATENT DOCUMENTS

| | | | | |
|---|---|---|---|---|
| 5,468,196 A | * | 11/1995 | Minowa et al. | 477/62 |
| 6,077,186 A | | 6/2000 | Kojima et al. | |
| 6,299,563 B1 | * | 10/2001 | Shimasaki | 477/5 |
| 6,319,168 B1 | | 11/2001 | Morris et al. | |
| 6,740,002 B1 | * | 5/2004 | Stridsberg | 477/14 |
| 6,922,623 B2 | * | 7/2005 | Rieger et al. | 701/67 |
| 7,689,330 B2 | * | 3/2010 | Moran | 701/22 |
| 2002/0053475 A1 | | 5/2002 | Bitsche et al. | |
| 2004/0204286 A1 | | 10/2004 | Stridsberg | |
| 2004/0259680 A1 | | 12/2004 | Ozeki et al. | |
| 2005/0064974 A1 | | 3/2005 | Bezian et al. | |

FOREIGN PATENT DOCUMENTS

| | | | |
|---|---|---|---|
| EP | 0922600 A | | 6/1999 |
| FR | 2832357 A1 | | 5/2003 |
| JP | 2001200920 A | * | 7/2001 |

OTHER PUBLICATIONS

International Search Report mailed Aug. 3, 2006 in PCT/FR2006/050165.

* cited by examiner

*Primary Examiner*—Mark Hellner
*Assistant Examiner*—Ari M Diacou
(74) *Attorney, Agent, or Firm*—Nicholas E. Seckel

(57) ABSTRACT

The present invention essentially concerns a method for a motor vehicle speed ratio shift. Said method uses a power transmission device (1.1) comprising a traction chain consisting of a heat engine (2), a clutch (3), an electrical machine (4), a gearbox (5), and wheels (6). The invention is characterized in that, upon shifting, the heat engine (2) is started before, during or after the torque (CMEL) observable on the shaft (11) of the electrical machine (4) is canceled, by means of a starter system (7) mechanically independent of the electrical machine (4).

10 Claims, 6 Drawing Sheets

STATE OF THE ART

STATE OF THE ART

SPEED RATIO SHIFT METHOD

Figure 1:
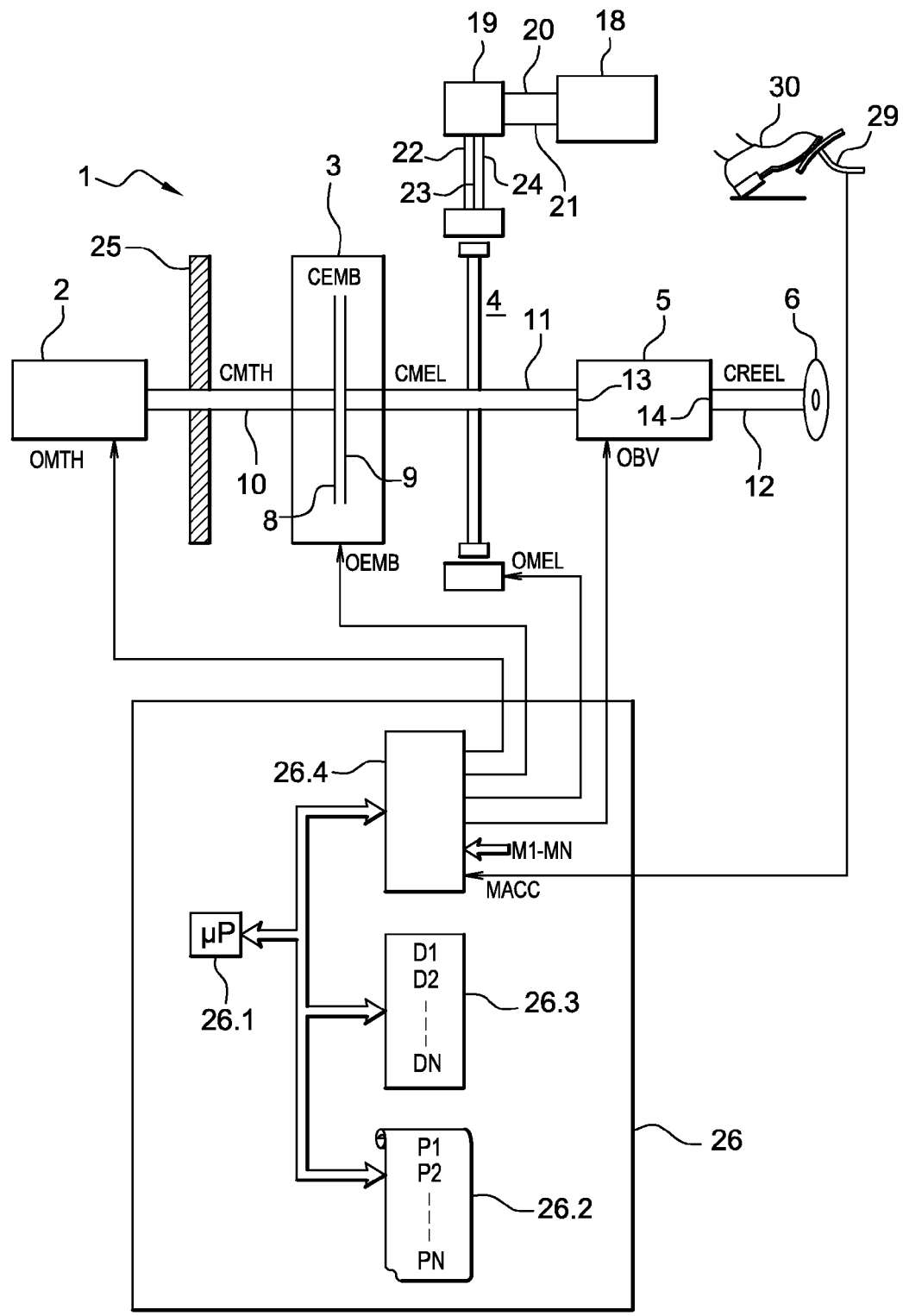

The present invention concerns a method of shifting gear ratios. A purpose of the invention is to carry out a gear ratio shift while at the same time ensuring continuity in the torque applied to a wheel shaft of the vehicle. Another purpose of the invention is to reduce the time during which the torque applied to the wheel shaft is zero during the gear ratio shift. The invention has a particularly useful application in motor vehicles, but it could also be implemented in any kind of hybrid propulsion land vehicle.

In the present text, the term "start" is used to designate the initiation of rotation of the heat engine crankshaft. The term "set in motion" is used to designate the initial movement of the vehicle from a zero speed to a non-zero speed. The term "powered on" is used with the electrical machine when it is turned on.

"Hybrid" vehicles are known that use a combination of heat energy and electrical energy to power their drive. This combining of energy sources is done in such a way as to optimize the fuel efficiency of such vehicles. This optimization of the fuel efficiency makes it possible for the hybrid vehicle to pollute far less and use far less fuel than vehicles operating solely on heat energy and whose efficiency is not optimized. Several types of hybrid vehicle power transmission devices are known.

Firstly, hybrid-type transmission devices are known that have an engine and a pair of electrical machines. The wheel shaft, the engine shaft and the shafts of the two machines are connected to one another through a mechanical assembly. This mechanical assembly is generally made up of at least two planetary gearsets. Such a transmission device is described in the French application FR-A-2832357.

Hybrid-type transmission devices having a heat engine and a single electrical machine connected to one another via a clutch are also known. Such a device is operable in two different modes. In a first mode, known as "electrical mode", the electrical machine alone powers the vehicle drive. In a second mode, known as "hybrid mode", the electrical machine and the heat engine together power the vehicle drive.

In hybrid mode, the power supplied by the electrical machine makes it possible to adjust the torque applied to the wheel shaft while also adjusting the torque and speed of the heat engine to an operating point at which its fuel consumption is optimized.

To this end, each member of the transmission device: heat engine, clutch, electrical machine and gearbox, is controlled by a local control device, which is in turn commanded by a specific computer known as a "supervising computer". This computer can either be independent or integrated into another computer, such as the engine computer. This supervising computer executes programs in particular to synchronize the actions of the various members of the transmission device with one another. This synchronization is carried out in such a way as to best fulfill a driver's request for acceleration.

More precisely, depending on the acceleration desired by the user and vehicle driving conditions, the supervising computer controls the various members of the device, selects the operating mode, coordinates the transitional phases of the various members, and chooses operating points for the engine and the electrical machine. The term "driving conditions" includes vehicle parameters as well as external parameters that can influence the operation of the vehicle. For example, the speed and the acceleration of the vehicle are vehicle parameters, whereas the slope of a hill on which the vehicle is traveling and road surface moisture are external parameters.

FIG. 1 shows a schematic representation of a transmission device 1 according to state of the art. This transmission device 1 has a heat engine 2, a clutch 3, an electrical machine 4, a gearbox 5, and wheels 6, which make up a traction drive. As a variant, the gearbox 5 is replaced by a speed controller.

More precisely, the clutch 3 has a first clutch plate 8 and a second clutch plate 9. The first clutch plate 8 is connected to a shaft 10 of the heat engine 2. And the second clutch plate 9 is connected to a shaft 11 of the electrical machine 4. Additionally, the shaft 11 of the electrical machine 4 and a shaft 12 of the wheels 6 are respectively connected to an input 13 and an output 14 of the gearbox 5.

As previously mentioned, the transmission device 1 is operable in two different modes. In electrical mode, the shaft 12 of the wheels 6 is driven by the electrical machine 4 alone. The clutch 3 is then released, so that the shaft 10 of the heat engine 2 and the shaft 11 of the electrical machine 4 are not coupled to one another. In this electrical mode, the electrical machine 4 generally operates as an engine. In a particular embodiment, then, the machine 4 draws energy from a storage system 18 such as a battery, notably through an inverter 19. The battery 18 delivers a DC voltage signal. In electrical mode, the inverter 19 thus transforms the DC voltage signal detectable between the battery terminals 20 and 21 into AC voltage signals, which are applied to phases 22-24 of the electrical machine 4.

In hybrid mode, the shaft 12 of the wheels 6 is driven by the heat engine 2 and the electrical machine 4. The clutch 3 is then engaged, so that the shaft 10 of the heat engine 2 and the shaft 12 of the wheels 6 are coupled to one another. The electrical machine 4 acts as an engine or as a generator and transmits power to the shaft 12 of the wheels 6 in order to adjust the detectable torque on the shaft 12 of the wheels 6 to the setpoint torque. In the same manner as that explained previously, the electrical machine 4 transfers energy with the battery 18.

In hybrid mode and electrical mode, during battery recharge phases that coincide with a deceleration of the vehicle, the electrical machine 4 acts as a generator. During these recharge phases, the electrical machine 4 supplies energy to the battery 18. The inverter 19 then transforms the AC voltage signals detectable on phases 22-24 of the electrical machine 4 into a DC voltage signal that is applied to the terminals 20 and 21 of the battery 18.

In practice, the electrical machine 4 is a three-phase synchronous machine. Machines of this type feature a compact design and good output.

In a particular embodiment, the transmission device 1 has a flywheel 25. This flywheel 25 performs a function of filtering out cyclical variations in order to ensure a continuous transmission of torque from the heat engine 2 to the shaft 12 of the wheels 6.

In addition, the transmission device 1 has a control unit consisting of the supervising computer 26 in this case. This supervising computer 26 has a microprocessor 26.1, a program memory 26.2, a data memory 26.3, and an input-output interface 26.4, which are connected to one another via a communication bus 31.

The data memory 26.3 contains data D1-DN, which correspond in particular to the characteristics of the various members of the transmission device 1, namely, the heat engine 2, the clutch 3, the electrical machine 4 and the gearbox 5. Some of the data D1-DN, for example, correspond to the response times of these members 2-5. Other data D1-DN, for example, correspond to maximum and minimum torques that can be applied to shafts associated with the members 2-5.

The input-output interface 26.4 receives signals M1-MN detectable at sensor outputs (not shown). These sensors make it possible to detect the vehicle driving conditions. For example, acceleration and speed sensors make it possible to know the acceleration and the speed of the vehicle, respectively, at any given moment. A slope sensor can detect whether the vehicle is on a slope or not. In addition, the interface 26.4 receives a MACC signal corresponding to a torque on the wheel as requested by a driver. This MACC signal is a function of how far down a pedal 29 is pushed by a driver's foot.

According to the data D1-DN, the driving conditions, and the acceleration requested by the driver, the microprocessor 26.1 executes one of the programs P1-PN that initiates the operation of the transmission device 1 in a particular mode, and adjusts the detectable torque on the shaft 12 of the wheels 6. That is, when one of the programs P1-PN is executed, the microprocessor 26.1 commands the interface 26.4 in such a way that signals OMTH, OEMB, OMEL and OBV are sent to the heat engine 2, the clutch 3, the electrical machine 4 and the gearbox 5, respectively, in order to control them in a particular mode.

When there is a change in operating mode, some of the programs P1-PN generate signals OMTH, OEMB, OMEL and OBV that direct the transition from one mode to another.

In addition, the members 2-5 of the transmission device 1 each have an internal control system that is not shown. These control systems make it possible to regulate the detectable torque values on shafts associated with these members 2-5.

In one example, a request for strong acceleration is made by the driver while the vehicle is changing gear ratios. The computer 26 then commands the members 2-5 in such a way that the detectable torque on the shaft 12 of the wheels 6 is as great as possible. That is, the computer 26 commands the members 2-5 so as to start the engine 2 and couple its shaft 10 with the shaft 11 of the electrical machine 4 as quickly as possible, not waiting for the gear ratio shift.

When the heat engine 2 is made to start at the same time a gear ratio shift is occurring, this is known as a synchronized start of the heat engine 2. This synchronized start initiates a special transitional regime in which both the gear ratio shift and the change in vehicle mode must be managed. During this transitional regime, in fact, the vehicle changes from electrical mode to hybrid mode while changing gear ratios. To manage the transitional regime, the computer 26 uses a specific control sequence of the members 2-5.

This transitional regime is particularly critical, since it can occur up to 50 times per driving hour, regardless of the vehicle speed or the gear ratio shift under way. To make the transitional regime as pleasant as possible for the driver, the time it takes to change the gear ratio and make the heat engine 2 available must be kept to a minimum. In addition, the level of acceleration requested by the driver must be maintained throughout the transitional regime. The torque applied to the wheel shaft must also be as continuous as possible throughout the transitional regime, and acoustic comfort must be maximized. Over-revving of the heat engine 2 must be avoided, then, and the startup noises of this heat engine 2 must not be heard.

Figure 2:
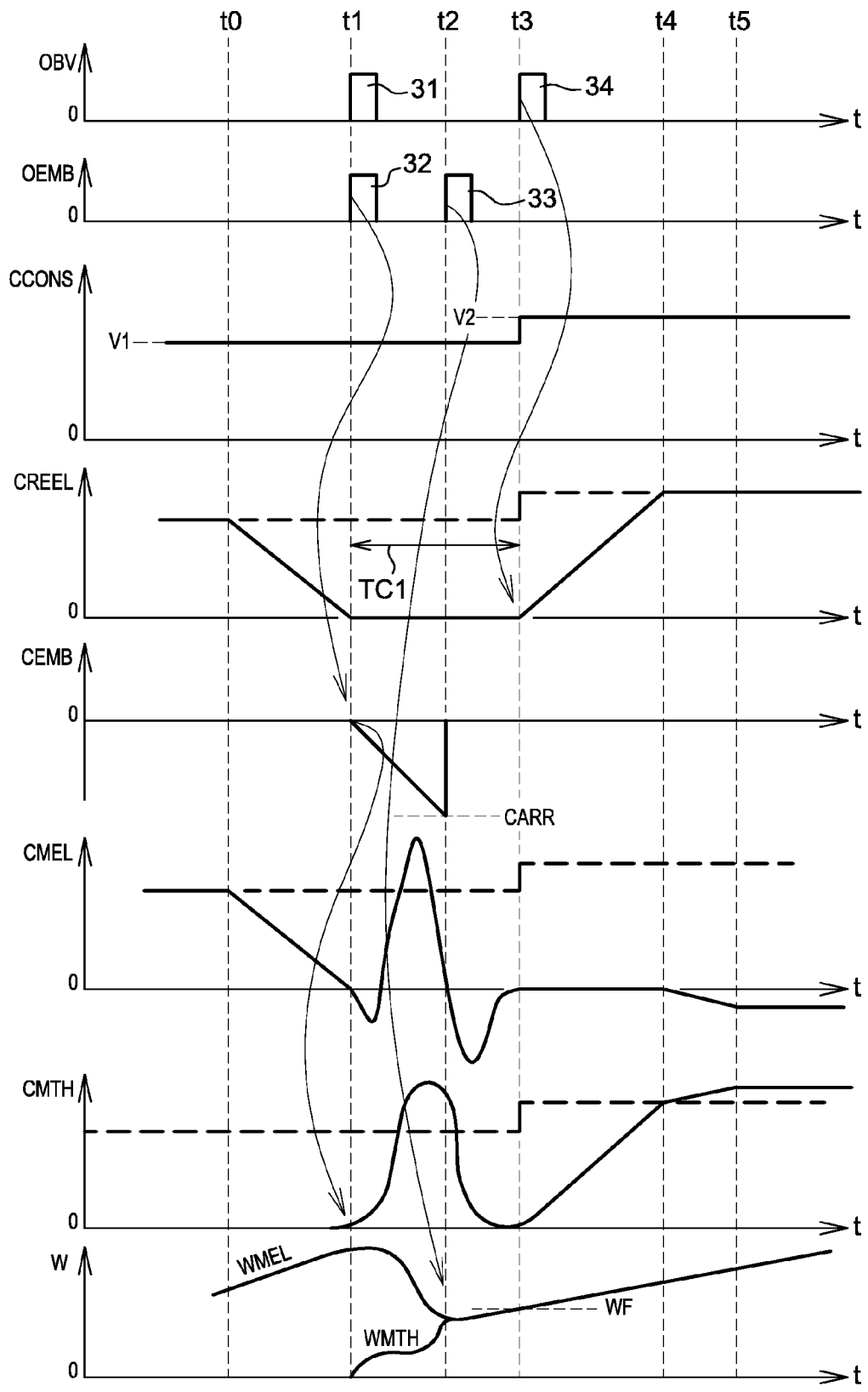

FIG. 2 shows some timing diagrams of detectable signals on the various members 2-5 of the state of the art transmission device 1. These signals are detectable during a synchronized start, that is, when the heat engine 2 starts at the same time a gear ratio shift is occurring.

More precisely, FIG. 2 shows the torque signals CEMB, CMEL and CMTH, which correspond to the detectable torque on the clutch 3, on the shaft 11 of the electrical machine 4, and on the shaft 10 of the heat engine 2, respectively.

FIG. 2 also shows the change over time in torque signals CCONS and CREEL, corresponding respectively to the setpoint torque to apply to the shaft 12 of the wheels 6 and the actual torque detectable on this shaft 12. The torque setpoint signal CCONS is established from the acceleration signal MACC and the signals M1-MN coming from the sensors.

The signals OEMB and OBV are sent from the supervising computer 26 to the clutch 3 and the gearbox 5 to command them. For greater simplicity, the signals OMTH and OMEL, which control the heat engine 2 and the electrical machine 4, respectively, are not shown.

Lastly, FIG. 2 shows on the same timing diagram the change over time in the rotation speed WMEL of the electrical machine 4 and the rotation speed WMTH of the heat engine 2.

On the graph showing the torque signals CREEL, CMEL and CMTH, the torque setpoint signal CCONS is represented as a dashed line.

At instant t0, the vehicle has already been set in motion. That is, this vehicle is moving and operating in electrical mode. The electrical machine 4 thus has a non-zero rotation speed and torque, whereas the heat engine 2 is off. At instant t0, the driver makes a request for acceleration that requires a gear shift and the startup of the heat engine 2.

Between instants t0 and t1, the transmission device 1 enters a first transitional phase. In this first phase, the setpoint torque CCONS has a value V1 that corresponds in particular to the acceleration requested by the driver. The computer 26 commands the electrical machine 4 so that its torque signal CMEL decreases linearly and is zero at instant t1. Since the heat engine 2 is not coupled to the shaft of the machine, the detectable torque signal CREEL on the shaft 12 of the wheels 6 parallels the change in the torque signal CMEL. This canceling of the detectable torque signal CREEL on the wheels 6 will make it possible to disengage the current gear ratio, as will be seen. Furthermore, the rotation speed WMEL of the electrical machine 4 tends to increase. The heat engine 2 is off. The heat engine 2 thus has a zero torque CMTH and a zero rotation speed WMTH. There is no detectable torque on the clutch 3.

Between instants t1 and t2, the transmission device 1 enters a second transitional phase. In this second phase, the heat engine 2 is started and the torque of this heat engine 2 is made available. But first, as soon as the torque signal CREEL reaches zero at instant t1, the computer 26 sends a signal 31 to the gearbox 5. This signal 31 commands the current gear ratio to disengage. The torque setpoint signal CCONS still has the value V1. In addition, a signal 32 is sent from the supervising computer 26 to the clutch 3. This signal 32 commands this clutch 3 in such a way that this clutch 3 transmits a breakaway torque CARR to the heat engine 2 to set it in rotation.

The electrical machine 4 is then in speed control mode and thus indirectly offsets the torque withdrawn by the clutch 3. So in this second transitional phase, the clutch torque signal CEMB decreases linearly and at instant t2 reaches a negative value equal to the breakaway torque value CARR. A heat engine 2 torque signal CMTH is then detectable, corresponding to the starting torque of this heat engine 2. The heat engine 2 then has a rotation speed WMTH that is increasing, but remains lower than the rotation speed WMEL of the electrical machine 4. The purpose of this second acceleration phase is to run the heat engine 2 through its first compression strokes. After having completed its first compression strokes, the heat engine 2 is operating at a high enough speed WMTH to be autonomous.

Between instants t2 and t3, the transmission device 1 enters a third transitional phase. During this third phase, the setpoint torque CCONS still has the value V1, whereas the detectable torque CREEL on the shaft 12 of the wheels 6 is still zero. At instant t2, when the rotation speeds WMEL and WMTH of the electrical machine 4 and of the heat engine 2 are roughly equal, a signal 34 is sent by the computer 26 to the clutch 3. This signal 34 commands the clutch 3 to engage. From the moment the clutch 3 is engaged, the rotation speeds WMTH and WMEL of the heat engine 2 and the electrical machine 4 merge. In this third phase, the speeds WMEL and WMTH of the electrical machine 4 and the heat engine 2 converge toward a target value WF. That is, the speeds WMEL and WMTH of the electrical machine 4 increase linearly and reach the target speed WF at instant t3.

Between instants t3 and t4, the transmission device 1 enters a fourth transitional phase. In this fourth phase, a withdrawal of torque occurs. The torque setpoint signal CCONS increases in a calibrated manner, stepwise, for example, and reaches a value V2 at instant t3. In addition, at instant t3, as soon as the speeds of the heat engine 2 and the electrical machine 4 have reached the target speed WF, a signal 35 is sent by the supervising computer 26 to the gearbox 5. This signal 35 commands the gearbox 5 so as to engage a new gear ratio. As soon as the new gear ratio is engaged, the computer 26 commands the heat engine 2 so as to make the detectable torque signal CREEL on the shaft 12 of the wheels 6 gradually approach the torque setpoint signal CCONS. Thus, the torque signal CREEL increases linearly and reaches the torque setpoint signal CCONS at instant t4. The torque signal CMEL of the electrical machine 4 is still zero. The rotation speeds of the heat engine WMTH and the electrical machine WMEL are both increasing linearly.

Between instants t4 and t5, the transmission device 1 enters a fifth acceleration phase. In this fifth phase, the engine members 2 and 4 of the device 1 converge toward their torque setpoint signal. The rotation speeds WMEL and WMTH increase with the speed of the vehicle.

Thus, at the time of this synchronized start, the time gap TC1 during which the gearbox 5 is in neutral is used to start the heat engine 2. This time gap TC1 occurs between instants t1 and t3. Since the gearbox 5 is in neutral and the detectable torque on the shaft 12 of the wheels 6 is zero, the heat engine 2 startup generates no disturbance in the detectable torque CREEL on the shaft 12 of the wheels 6.

However, this gear ratio shifting method creates two major problems in particular. Firstly, the time gap TC1 is lengthened by the time it takes the heat engine 2 to start. That is, once the gear ratio is disengaged at the end of the first phase, the new gear ratio cannot be engaged until after the heat engine 2 has been started and synchronized during the second and third phases. Furthermore, this time gap TC1 varies widely according to the quality of the torque signal CMTH monitoring. This quality issue in the monitoring of the torque signal CMTH depends largely on the vehicle driving conditions. For example, the time gap TC1 is shorter when the heat engine 2 is warm than when it is cold.

Furthermore, in order to correctly engage a gear ratio, the speeds WMTH and WMEL of the heat engine 2 and the electrical machine 4 must attain the target speed WF with great precision. And the detectable torque CREEL on the shaft 12 of the wheels 6 must be exactly zero. But it is very difficult to arrive at a precise speed of the electrical machine 4 and the heat engine 2 when a quick coupling is occurring between the shaft 10 of the heat engine 2 and the shaft 11 of the electrical machine 4. In practice, it is difficult to perform synchronized starts during gear ratio downshifts. Moreover, at the moment this quick coupling is taking place, the shaft 11 of the electrical machine 4 has so much inertia that it is very difficult, even impossible, to control the torques applied to the shafts associated with the various members 2-5 of the device 1. This lack of torque control causes a premature wearing of the dogs in the gearbox 5. "Quick coupling" is defined as a coupling accomplished in 0 to 200 ms.

Consequently, the state of the art starting method does not make it possible to meet the required criteria for synchronized starts. Indeed, with such a method, gear ratio shift times are long and fragmented. Moreover, problems occur in engaging gear ratios due to wear and tear of the gearbox 5.

The invention thus proposes in particular to reduce the time gap and the mechanical constraints imposed on the various members of the transmission device during a synchronized start.

To this end, in the invention, the known architecture of the transmission device is supplemented with a starting system that is mechanically independent of the electrical machine. This starting system drives the heat engine without changing the torque applied to the wheel shaft. In the invention, thus, it is no longer the clutch, but the starting system that transmits the breakaway torque to the heat engine in order to make it start. In this way, this starting system makes it possible to dissociate the problems of starting the engine from those of the vehicle traction drive and gear ratio shifting.

In accordance with the invention, to change from electrical mode to hybrid mode during a gear ratio shift, the speed of the electrical machine is approaching the target speed while the engine is starting and preparing to come into synchronization via the clutch. This means that the gear ratio shift can occur before the heat engine has started. Thus, with the invention it is no longer necessary to wait for the heat engine to be coupled to the shaft of the electrical machine in order to engage a new gear ratio.

In such a method, the time gap is much shorter than the time gap in the state of the art method. The synchronization time, during which the speed of the electrical machine is approaching the target speed, is thus much shorter in the invention than in the state of the art method. This synchronization time is actually identical to the synchronization time detectable during a gear ratio shift in electrical mode. In addition, the inertia of the wheel shaft is much lower than in the state of the art method. This low inertia facilitates gear ratio disengagement and engagement, thereby reducing gearbox wear and tear and noise.

In implementing the method according to the invention, at the time the heat engine is started, a check is performed to see whether there is enough time between this startup and the next gear ratio shift for the heat engine shaft to finish coupling with the electrical machine shaft. If there is enough time, then the coupling is authorized. Conversely, if there is not enough time, then the engine is authorized to start, but the coupling is delayed while the vehicle gear ratio shift is authorized.

Furthermore, introducing the starting system simplifies the control of the clutch and of the electrical machine during a synchronized start. The new architecture, then, makes it possible to bypass synchronizing the actions of the clutch with those of the electrical machine.

The invention thus concerns a method of shifting a gear ratio of a vehicle utilizing a power transmission device having a heat engine that is off and an electrical machine, this electrical machine being connected firstly to the heat engine through a disengaged clutch and secondly to a wheel shaft through a gearbox, characterized in that, in order to start the heat engine during a gear ratio shift, the heat engine is started by a starting system that is mechanically independent of the electrical machine.

Figure 3:
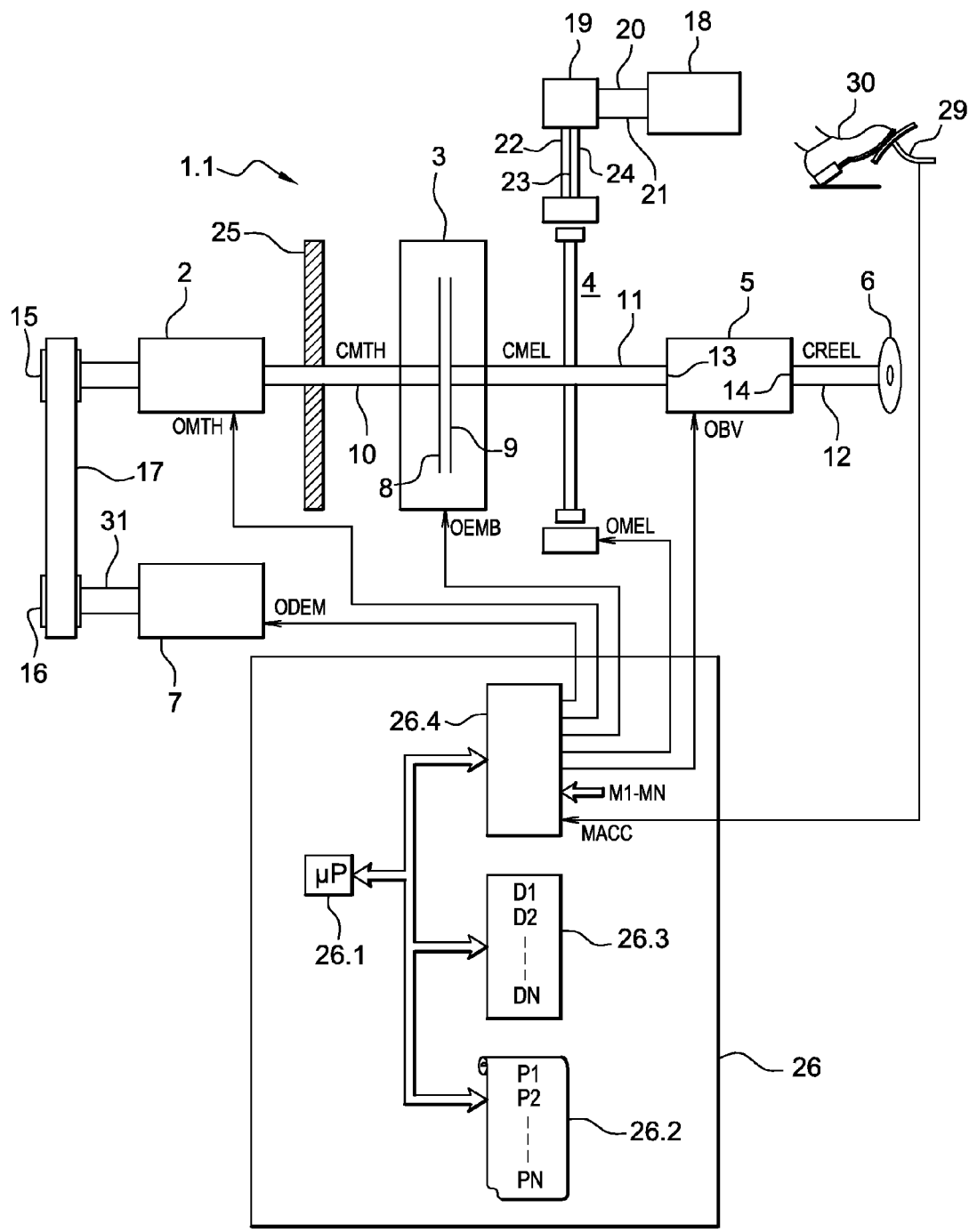
Figure 4:
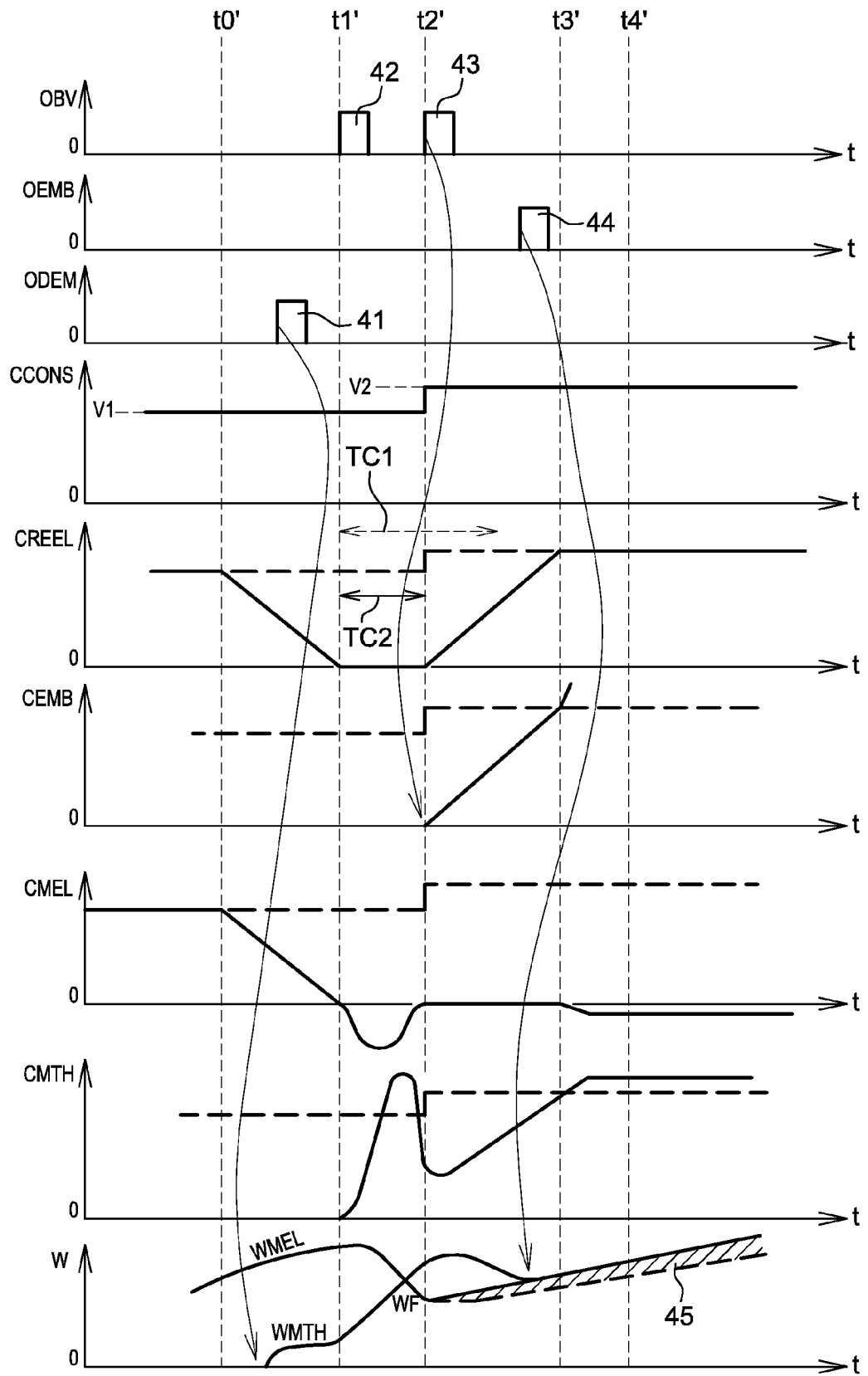
Figure 5:
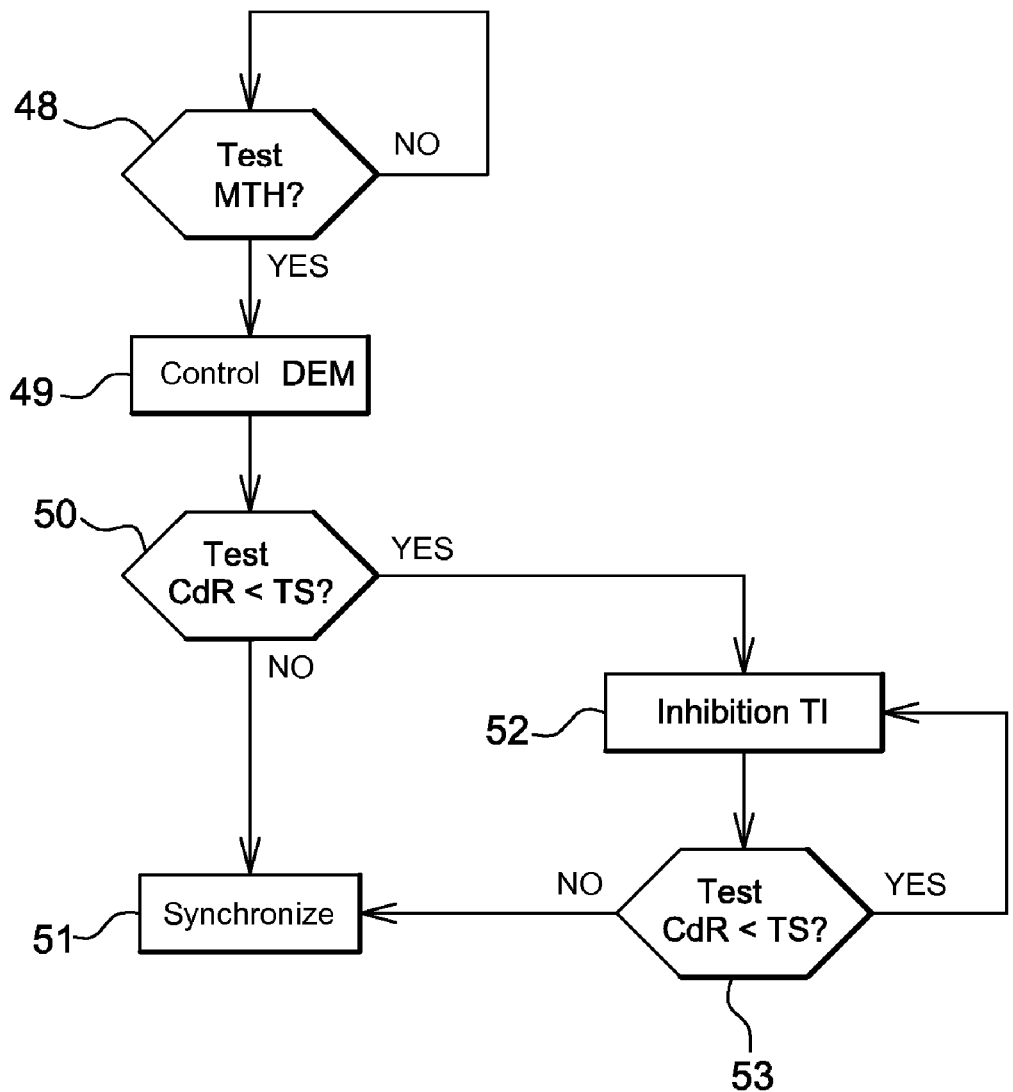
Figure 6:
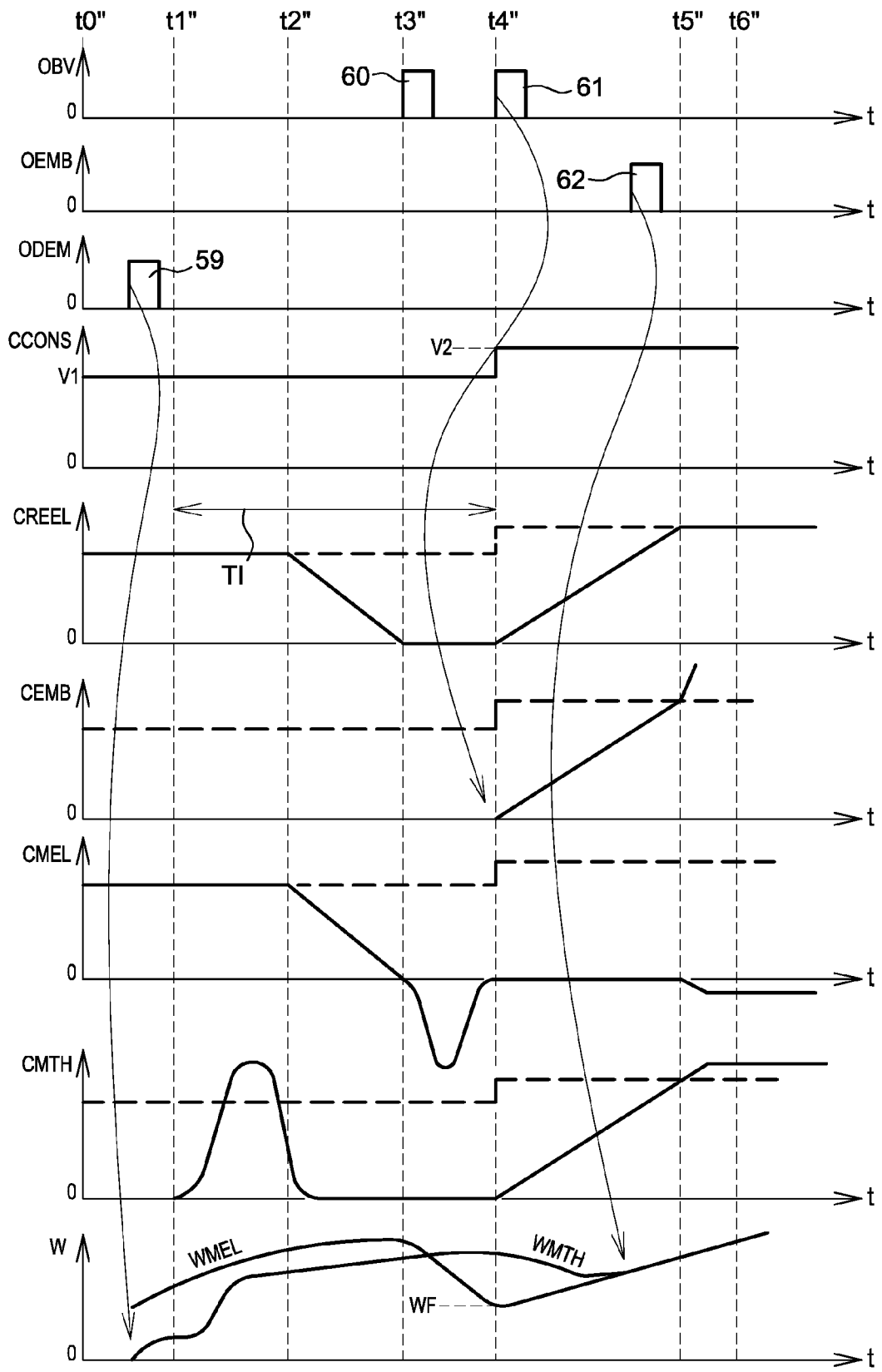

The following description and accompanying figures will make the invention more easily understood. These figures are given as an illustration, and are in no way an exhaustive representation of the invention. These figures show:

FIG. 1 (already described): a schematic representation of a state of the art power transmission device;

FIG. 2 (already described): timing diagrams representing the change over time in detectable signals on members of a state of the art transmission device during a synchronized start;

FIG. 3: a schematic representation of a power transmission device according to the invention;

FIG. 4: timing diagrams representing the change over time in detectable signals on members of a transmission device according to the invention during a synchronized start;

FIG. 5: a diagram of stages of the method according to the invention implemented according to the time between the heat engine startup and a gear ratio shift;

FIG. 6: timing diagrams representing the change over time in detectable signals on members of a transmission device according to the invention when there is not enough time between a heat engine startup and a gear shift to authorize a coupling between the heat engine and the electrical machine.

FIG. 3 shows a schematic representation of a transmission device 1.1 according to the invention. Like the state of the art transmission device 1, this transmission device 1.1 has a heat engine 2, a clutch 3, an electrical machine 4, a gearbox 5 and wheels 6. The four members 2-5 and the wheels 6 of the vehicle make up a traction drive, and are arranged in the same manner as in the state of the art transmission device 1. In addition, in accordance with the invention, the transmission device 1.1 has a starting system 7 connected to the heat engine 2.

The starting system 7 therefore never contributes power to the drive.

For this reason it is appropriately sized to generate just enough power to start the heat engine 2, which is significantly less power than that of the electrical machine 4, and which does not require high input voltage.

This starting system 7 is connected to the heat engine 2 and sets it in rotation in order to start it. The starting system 7 is mechanically independent of the electrical machine 4. So the starting system 7 starts the heat engine 2 without drawing any power from this traction drive. Consequently, starting the heat engine 2 no longer has any impact on the continuity of the torque applied to the shaft 12 of the wheels 6.

In a particular embodiment, the heat engine 2 has a first pulley 15 attached to one end of its shaft 10. And the starting system 7 has a second pulley 16 attached to one end of its shaft 31. A belt 17 runs through the grooves in these two pulleys 15 and 16 so as to connect the starting system 7 to the heat engine 2.

In the invention, the electrical machine 4 is always connected to a storage device 18, such as a battery. As a variant, the storage system 18 is an inertia machine or a supercondenser.

In a particular embodiment, the transmission device 1.1 can also have a flywheel 25. This flywheel 25 is connected to the shaft 10 of the heat engine 2, between this heat engine 2 and the clutch 3.

Additionally, the transmission device 1.1 according to the invention has the supervising computer 26. When one of the programs P1-PN is executed, the microprocessor 26.1 commands the interface 26.4 so that, in addition to the signals OMTH, OEMB, OMEL, OBV, a signal ODEM is sent to the starting system 7 to control it. The signals OMTH and OMEL control the heat engine 2 and the electrical machine 4, respectively, in such a way that this heat engine 2 always runs at its optimal operating point, where, for a given power level, it consumes a minimum of fuel.

When there is a change in operating mode, some of the programs P1-PN generate signals OMTH, OEMB, OMEL, OBV and ODEM that enable the transition from one mode to another.

The starting system 7 also has an internal control system that is not shown. This control system makes it possible to regulate the value of the breakaway torque that this starting system 7 must apply to the shaft 10 of the heat engine 2. This breakaway torque is generally constant.

In the invention, the clutch 3 is a wet or dry plate clutch.

FIG. 4 shows some timing diagrams of detectable signals on the various members 2-5 of the transmission device 1.1 according to the invention. As in FIG. 2, these signals can be detected during a synchronized start of the heat engine 2. The torque setpoint signal CCONS is represented as a dashed line on the timing diagrams of the torque signals CREEL, CEMB, CMEL and CMTH.

For greater simplicity, only the signals OBV, OEMB and ODEM that play a leading role during the synchronized start are represented.

At instant t0', the vehicle has already been set in motion. That is, this vehicle is moving and operating in electrical mode, in which the electrical machine 4 has already been powered on. The electrical machine 4 then has a non-zero rotation speed WMEL and a non-zero torque CMEL, whereas the heat engine 2 is off. At instant t0', driving conditions require a gear ratio shift at the same time as, or before, the starting of the heat engine 2.

Between instants t0' and t1', the transmission device 1.1 enters a first transitional phase. In this first phase, the setpoint torque CCONS has a value V1 corresponding in particular to the acceleration request of the driver. The torque signal CMEL of the electrical machine 4, which is equal to V1 at instant t0', decreases in a linear and calibratable manner so that at instant t1', this signal CMEL is zero. Since the shaft 10 of the heat engine 2 is not coupled with the shaft 11 of the electrical machine 4, the torque signal CREEL follows exactly the same path as the torque signal CMEL of the electrical machine 4. In addition, during this first phase, a signal 41 is sent by the computer 26 to the starting system 7. This signal 41 commands the starting system 7 so as to make this starting system 7 transmit the breakaway torque or starting torque to the heat engine 2 and set it in rotation. Once the heat engine 2 has run through its first compression strokes, from 3 to 5 in one example, a signal is sent by the computer 26 to the starting system 7 to cut off this starting system 7, in other words, to stop it. The rotation speed WMTH of the heat engine 2 then tends to increase, but remains lower than the rotation speed WMEL of the electrical machine 4. The engine torque CMTH is zero. There is no detectable torque on the clutch 3, since it no longer participates in starting the heat engine 2.

Between instants t1' and t2', the transmission device 1.1 enters a second transitional phase. In this second phase, the torque setpoint signal CCONS still has the value V1. At instant t1', as soon as the torque signal CREEL is zero, a signal 42 is sent by the computer 26 to the gearbox 5. This signal 42 commands the gearbox 5 so as to disengage the current gear ratio. It is preferable to have the gear ratio disengaged when the torque signal CREEL is zero, as it is here. As a variant, for a gear ratio disengagement under torque, the gear ratio can be disengaged when the torque signal CREEL is not zero by controlling the members 2-5 in a particular way. The torque signal CMEL of the electrical machine 4 begins a negative oscillation. A heat engine 2 torque signal CMTH is detectable, corresponding to the starting torque of this heat engine 2. The electrical machine 4 is controlled so as to make its rotation speed WMEL converge toward the target speed WF. The rotation speed WMTH of the heat engine 2 increases so that at instant t2', it is higher than the rotation speed WMEL of the electrical machine 4. At the end of this second phase, the heat engine 2 is operating at a high enough speed WMTH to be autonomous.

Between instants t2' and t3', the transmission device 1.1 enters a third transitional phase, which is a torque pick-up phase. That is, in this third phase the setpoint torque CCONS increases while the shaft 10 of the heat engine 2 and the shaft 11 of the electrical machine begin coupling.

More precisely, during this third phase, the torque setpoint signal CCONS increases in a calibratable, stepwise manner and reaches a value V2 at instant t2'. At instant t2', as soon as the rotation speed WMEL of the electrical machine 4 reaches the target speed WF, a signal 43 is sent by the computer 26 to the gearbox 5. This signal 43 commands the gearbox 5 so as to engage a new gear ratio. The clutch 3 is then commanded so that its plates 8 and 9 begin to slide relative to one another. The detectable torque signal CEMB on the clutch 3 then increases linearly. And the torque signal CMTH of the heat engine 2, which was not zero, also increases in a roughly linear fashion. Thus, as soon as the next gear ratio is engaged, a torque reengagement occurs. The torque signal CREEL then increases to reach the torque setpoint signal CCONS at instant t3'. The rotation speed WMTH of the heat engine 2 approaches the rotation speed WMEL of the electrical machine 4. When these two rotation speeds WMEL and WMTH are equal, a signal 44 is sent to the clutch. This signal 44 commands the clutch 3 to engage. From the instant the clutch 3 is engaged, the rotation speeds WMTH and WMEL of the heat engine 2 and the electrical machine 4 merge.

Between instants t3' and t4', the transmission device 1.1 enters a fourth transitional phase. In this fourth phase, the engine members 2 and 4 of the device 1.1 each converge toward an optimal torque setpoint value in terms of the heat engine 2 fuel consumption, if they have not already reached it. These setpoint signals are established by the computer 26 so as to make the heat engine 2 run at its optimal operating point. More precisely, the torque signal CCONS still has the value V2. The torque signal CMTH of the heat engine 2 then increases slightly, while the torque signal CMEL of the machine 4 decreases symmetrically relative to the torque signal CMTH. This way, the torque signal CREEL is always equal to the setpoint signal CCONS. The rotation speeds of the heat engine WMTH and the electrical machine WMEL increase, due to the application of CMTH.

Thus, when the new gear ratio engages, the clutch 3 is disengaged and remains so for a pre-determined time period extending from t0' to t2'. This time period can be a function of the time needed to change gears and/or the time needed for the heat engine 2 to become autonomous. As a variant, the clutch 3 could be engaged when the heat engine 2 starts, in which case the members 2-5 are controlled in a particular way.

In this case, the heat engine 2 is started while the detectable torque CREEL on the shaft 12 of the wheels 6 is being canceled. As a variant, the heat engine 2 is started before or after torque CREEL cancellation. The signal 41 can in fact be sent before, during or even after the torque signal CREEL begins to decrease.

A time gap TC2 during which a zero torque is detectable on the shaft 12 of the wheels 6 is shorter than the time gap TC1 detectable in the state of the art method, represented by a dashed line. Consequently, the gear ratio shift in the method according to the invention is more reliable for the driver than in the state of the art method. That is, the time during which the setpoint torque CCONS is not achieved is much shorter in the method according to the invention than in the state of the art method.

Furthermore, although the two electrical machines 4 have the same dimensions, the rotation speed of the electrical machine 4 of the device 1.1 according to the invention is greater than the rotation speed of the electrical machine 4 of the state of the art device 1 for the same setpoint torque CCONS. The device 1.1 according to the invention thus enables greater acceleration during synchronized starting than the state of the art device 1. This gain in acceleration is represented on the timing diagram of rotation speeds as a shaded area 45.

Additionally, in the invention, when the breakaway torque is transmitted by the starting system 7, the actions applied to the clutch 3 by the heat engine 2 and the electrical machine 4 are applied independently of one another. One action applied by the electrical machine 4 is to power the vehicle. One action applied by the heat engine 2 is an action by the starting system 7, namely, starting the heat engine 2.

Moreover, in the method according to the invention, the heat engine 2 startup is more robust than in the state of the art method. That is, the starting system 7 starts the heat engine 2 with a generally constant torque, regardless of the vehicle driving conditions.

FIG. 5 shows stages of an alternative gear shifting method according to the invention. These stages are implemented according to the time between the heat engine 2 startup and a gear ratio shift.

More precisely, in a first stage 48, a check is performed to see whether a request has been made to start the heat engine 2. This startup request is dependent on the vehicle driving conditions. That is, this startup request depends in particular on the signals M1-MN and MACC that the computer 26 receives. If no startup request is made, then there is a return to stage 48. Conversely, if a startup request is made, a second stage 49 is initiated.

In this second stage 49, the computer 26 commands the starting system 7 to turn on, which provides the breakaway torque to the heat engine 2 in order to start it. After the heat engine 2 has been started, a third stage 50 is initiated.

In this third stage 50, a check is performed to see whether there is enough time between the heat engine 2 startup and a gear ratio shift to authorize a coupling between the heat engine 2 shaft 10 and the electrical machine 4 shaft 11. That is, the computer 26 manages two different processes in particular, which are executed concurrently: a first process of starting the heat engine 2 and a second process of changing the vehicle operating mode. This third stage 50 makes it possible to time the coupling of the engine 2 with the machine 4 as a function of when the gear shift occurs.

More precisely, a check is performed to see whether the time period CdR between a prior order to start the heat engine 2 and a subsequent order to shift gear ratios is less than a threshold time period TS. The threshold time period TS is adjustable and corresponds approximately to the time needed for the heat engine 2 to start and for its shaft 10 to couple with the shaft 11 of the electrical machine 4. In one example, this threshold time TS is equal to 350 ms and is slightly longer than the average time needed for the shafts of the heat engine 2 and the electrical machine 4 to finish coupling.

If the time CdR between a heat engine 2 startup and a gear shift is greater than the threshold time TS, then a stage 51 is initiated. In this stage 51, the coupling of the engine 2 shaft with the machine 4 shaft is authorized.

However, if the time between the engine 2 startup and the gear shift is less than the threshold time TS, then a time delay stage 52 is initiated. In this time delay stage 52, the coupling of the heat engine 2 and the machine 4 shafts is delayed for a time delay period T1. During this time delay period T1, the clutch plates 8 and 9 are not even authorized to begin sliding relative to one another. During the time delay period T1, the gear shift takes place. The time delay period T1 is therefore calculated in such a way that there is time to complete the gear ratio shift. In one example, the time delay period T1 is 450 ms. The time delay period is adjustable as well, and is generally greater than the threshold time TS. After the time delay stage 52, a new stage 53 is initiated.

In this stage 53, a check is performed to see whether the time between the end of the time delay stage and an upcoming gear ratio shift is greater or less than the threshold time TS. If the time between the time delay stage and the upcoming gear ratio shift is less than the threshold time TS, then stage 52 is repeated. Otherwise, stage 51 is initiated. Stage 53 can be used in a transmission device 1.1 in which very closely spaced gear ratio shifts are authorized.

As a variant, stage 51 is initiated directly after stage 52.

In the method according to the invention, the heat engine 2 is thus started as soon as it is needed. However, its coupling with the shaft 11 of the electrical machine 4 is delayed if the time between its startup and a gear ratio shift is less than the threshold time TS. The method according to the invention thus makes it possible to avoid interrupted coupling attempts due to gear ratio shifts that are too close in time to the starting of the heat engine 2.

FIG. 6 shows timing diagrams of detectable signals on the various members 2-5 of the transmission device 1.1 according to the invention when the time between a heat engine 2 startup and a gear ratio shift is less than the threshold time period TS. The setpoint signal CCONS is again represented here as a dashed line on the diagrams of the torque signals CREEL, CEMB, CMEL and CMTH.

For greater simplicity, only the signals OEMB, OBV and ODEM that play a leading role are shown.

At instant t0", the vehicle is in motion and operating in electrical mode. The electrical machine 4 then has a non-zero rotation speed WMEL and a non-zero torque CMEL, while the heat engine 2 is off. At instant t0", the computer 26 detects the need to start the heat engine 2.

Between instants t0" and t1", the transmission device 1.1 enters a first transitional phase. During this first phase, the torque setpoint signal CCONS has a value V1 corresponding in particular to the acceleration request of the driver. A little before instant t1", a signal 59 is sent from the computer 26 to the starting system 7. This signal 59 commands the starting system 7 in such a way that the starting system 7 provides the breakaway torque to the heat engine 2 in order to start it. The rotation speed WMTH of the heat engine 2 then trends upward, but remains lower than the rotation speed WMEL of the electrical machine 4. The torque signal CMEL of the electrical machine 4 is equal to the torque setpoint signal CCONS. The torque signal CREEL thus merges with the torque setpoint signal CCONS expected on the shaft 12 of the wheels 6. There is no detectable torque on the clutch 3, since it is not involved in starting the heat engine 2.

Between instants t1" and t2", the transmission device 1.1 enters a second transitional phase. This second phase is a detection and decision-making phase. That is, at instant t1", the computer 26 detects that the time period between the heat engine 2 startup and a gear ratio shift is less than the threshold time TS. The computer 26 will thus command the members 2-5 so as to delay the coupling between the shafts of the heat engine 2 and of the electrical machine 4, as will be seen. During the second transitional phase, the torque signal CMEL of the electrical machine 4 has the same value V1 as the torque setpoint signal CCONS. Since the shaft 10 of the heat engine 2 is still not coupled with the shaft 11 of the electrical machine 4, the torque signal CREEL merges with the torque setpoint signal CCONS. A torque signal CMTH is detectable on the shaft 10 of the heat engine 2, corresponding to the starting torque of the heat engine 2. The rotation speed WMTH of the heat engine 2 is increasing, but remains lower than the rotation speed WMEL of the electrical machine 4.

Between instants t2" and t3", the transmission device 1.1 enters a third transitional phase. In this third phase, the computer 26 commands the electrical machine 4 so as to cancel the torque CMEL of this machine 4. Thus, the torque signal CMEL of the electrical machine 4 decreases linearly, so that it is zero at instant t3". Since the shaft of the heat engine 2 is still not coupled with the shaft 11 of the electrical machine 4, the torque signal CREEL parallels the torque signal CMEL of the electrical machine 4. Canceling the detectable torque signal CREEL on the shaft 12 of the wheels 6 will allow the current gear ratio to disengage, as will be seen. At the outset of the third phase, the heat engine 2 is on and ready for synchronization. The torque setpoint signal CCONS is still equal to V1.

Between instants t3" and t4", the transmission device 1.1 according to the invention enters a fourth transitional phase. In this fourth phase, the value of the torque setpoint signal CCONS is still equal to V1. At instant t3", as soon as the detectable torque signal CREEL on the shaft 12 is zero, a signal 60 is sent to the gearbox to command the current gear ratio to disengage. The torque signal CMEL of the electrical machine 4 begins a negative oscillation. The rotation speed WMEL of the electrical machine 4 converges toward a target speed WF in order to authorize a new gear ratio to engage, as will be seen.

Between instants t4" and t5", the transmission device 1.1 enters a fifth transitional phase. In this fifth phase, the torque signal CCONS increases in a stepwise manner to reach a value V2 at instant t4". At instant t4", as soon as the electrical machine 4 reaches the target speed WF, a signal 61 is sent by the computer 26 to the gearbox 5. This signal 61 commands the gearbox so as to engage a new gear ratio. The coupling delay is over as soon as the new gear ratio is engaged. Thus, at instant t4", the clutch plates 8 and 9 begin sliding with respect to one another. The torque signal CMTH of the heat engine 2 and the torque signal CEMB of the clutch 3 both increase at this point. Consequently, the torque signal CREEL also increases to reach the setpoint torque signal CCONS at instant t5". The rotation speed WMTH of the heat engine 2 approaches the rotation speed WMEL of the electrical machine 4. When these two rotation speeds WMEL and WMTH are equal, a signal 62 is sent to the clutch 3. This signal 62 commands the clutch 3 to engage. From the instant the clutch 3 engages, the rotation speeds WMTH and WMEL of the heat engine 2 and the electrical machine 4 merge.

Between instants t5" and t6", the transmission device 1.1 enters a sixth acceleration phase. As already mentioned, in this sixth phase, the engine members 2 and 4 of the device 1.1 converge toward their optimal torque setpoint value, if they have not already reached it. These setpoint signals are established so as to make the heat engine 2 run at its optimal operating point. More precisely, the torque signal CCONS still has the value V2. The torque signal CMTH of the heat engine 2 then increases slightly, while the torque signal CMEL of the electrical machine 4 decreases symmetrically with respect to the torque signal CMTH, in one example. In this way, the torque signal CREEL is always equal to the setpoint signal CCONS. The rotation speeds of the heat engine WMTH and the electrical machine WMEL increase linearly with the vehicle speed.

Thus, whether the heat engine 2 starts before, during or after a gear ratio shift, the starting system 7 always makes it possible to reduce the time this gear ratio shift takes. This is because the synchronization of the wheel shaft with the target speed WF is always carried out by the electrical machine 4, which is not affected by the clutch 3. In the invention, moreover, since the inertia of the shaft 11 of the electrical machine 4 is controlled, the time it takes for a gear ratio to engage or disengage is generally constant regardless of the driving conditions.

As a variant, the method according to the invention is used while the electrical machine 4 is off, to set the vehicle in motion.

The invention claimed is:

1. Method of shifting gear ratios of a vehicle utilizing a power transmission device having a heat engine and an electrical machine, this electrical machine being connected firstly to the heat engine through a clutch and secondly to a shaft of wheels through a gearbox, said method comprising, in order to start the heat engine when both an order to start the heat engine and an order to perform a gear shift have been issued and the heat engine is off at a time the order to perform a gear shift is issued:
   (i) starting the heat engine using a starting system connected to the heat engine and mechanically independent of the electrical machine, while the vehicle is being powered by the electrical machine alone,
   (ii) performing the gear shift,
   wherein the performance of the gear shift comprises:
      canceling a detectable torque on the shaft of the electrical machine,
      making the rotation speed of the electrical machine converge toward a target speed before the new gear ratio is engaged, and
      engaging a new gear ratio, and
   (iii) coupling the heat engine and the electrical machine via the clutch after performing the gear shift,
   wherein, when the order to start the engine is prior to the order to shift gear ratios, and a time period between the prior order to start the heat engine and the subsequent order to shift gear ratios is less than a threshold time period (TS) corresponding to a time needed for the heat engine to start and to couple with the electrical machine, the method comprises:
      authorizing the heat engine to start, but
      delaying the coupling between the shaft of this heat engine and the shaft of the electrical machine as long as the new gear ratio has not been engaged,
   so that the starting system dissociates the starting of the heat engine from the gear shifting of the vehicle.

2. Method according to claim 1, wherein the coupling of the heat engine and the electrical machine via the clutch comprises:
   maintaining the clutch, which was disengaged up to a time of engaging a new gear ratio, disengaged while the new gear ratio engages, and
   engaging the clutch after the engagement of the new gear ratio.

3. Method according to claim 2, wherein:
   the shaft of the heat engine is coupled with the shaft of the electrical machine while torque is reactivated.

4. Method according to claim 2, comprising:
   making each of the heat engine and the electrical machine converge toward an optimal setpoint torque in terms of the heat engine fuel consumption, after coupling the shaft of the heat engine with the shaft of the electrical machine.

5. Method according to claim 1, wherein:
   the threshold time period (TS) is approximately 350 ms.

6. Method according to claim 1, comprising:
   once the heat engine has started, allowing the heat engine to run through some initial compression strokes in order to be autonomous, and then cutting off the starting system.

7. Method according to claim 1, wherein:
   the heat engine is started before the detectable torque on the shaft of the electrical machine is canceled.

8. Motor vehicle configured to perform the method according to claim 1.

9. Method according to claim 1, wherein:
   the heat engine is started while the detectable torque on the shaft of the electrical machine is being canceled.

10. Method according to claim 1, wherein:
    the heat engine is started after the detectable torque on the shaft of the electrical machine has been canceled.

* * * * *